(12) United States Patent
Mongrenier et al.

(10) Patent No.: US 11,023,693 B2
(45) Date of Patent: Jun. 1, 2021

(54) MANAGEMENT SYSTEM, INSTALLATION AND ASSOCIATED ASSEMBLY METHOD

(71) Applicant: WID GROUP, Bernay (FR)

(72) Inventors: Alexandre Mongrenier, Manneville-sur-Risle (FR); Benoît Sudre, Gif sur Yvette (FR)

(73) Assignee: WID GROUP, Bernay (FR)

( * ) Notice: Subject to any disclaimer, the term of this patent is extended or adjusted under 35 U.S.C. 154(b) by 0 days.

(21) Appl. No.: 16/464,663

(22) PCT Filed: Nov. 29, 2017

(86) PCT No.: PCT/EP2017/080844
§ 371 (c)(1),
(2) Date: May 28, 2019

(87) PCT Pub. No.: WO2018/099986
PCT Pub. Date: Jun. 7, 2018

(65) Prior Publication Data
US 2019/0347454 A1    Nov. 14, 2019

(30) Foreign Application Priority Data

Nov. 29, 2016  (FR) ..................... 16 61654

(51) Int. Cl.
*G06Q 30/00*       (2012.01)
*G06Q 90/00*       (2006.01)
(Continued)

(52) U.S. Cl.
CPC ....... *G06K 7/10366* (2013.01); *G05B 19/042* (2013.01); *G06K 7/10316* (2013.01); *G05B 2219/45054* (2013.01)

(58) Field of Classification Search
USPC ....................................... 235/383, 385, 451
See application file for complete search history.

(56) References Cited

U.S. PATENT DOCUMENTS 5,221,831 A * 6/1993 Geiszler ................. B65G 47/50
235/440
2004/0195306 A1* 10/2004 Carlson ................. G07F 7/0609
235/375
(Continued)

FOREIGN PATENT DOCUMENTS

| CN | 104573582 A | 4/2015 |
| EP | 2782045 A2 | 9/2014 |
| FR | 3027700 A1 | 4/2016 |

OTHER PUBLICATIONS

Search Report for French Application No. 1661654, dated Sep. 6, 2017 in 2 pages.
(Continued)

*Primary Examiner* — Tuyen K Vo
(74) *Attorney, Agent, or Firm* — Knobbe, Martens, Olson & Bear, LLP

(57) ABSTRACT

The invention relates to a bottle case management system, each bottle being provided with an electronic chip, the management system comprising:
- a first frame (160) having a first shape,
- a second frame (162) having a second form, the second shape being complementary to the first shape,
- the assembly of the two frames (160, 162) forming a framework delimiting an internal opening intended for the insertion of a conveyor (58) on which cases (12) run in a running direction (X), the internal opening having a dimension along a direction orthogonal to the running direction between 300 mm and 1000 mm, at least one chip reader being comprised in the frame.

14 Claims, 4 Drawing Sheets

(51) Int. Cl.
G06K 7/10 (2006.01)
G05B 19/042 (2006.01)

(56) References Cited

U.S. PATENT DOCUMENTS

| | | | |
|---|---|---|---|
| 2009/0212954 A1* | 8/2009 | Adstedt | B65D 41/00 340/572.8 |
| 2009/0251286 A1* | 10/2009 | Black | H04Q 9/00 340/10.1 |
| 2010/0170201 A1* | 7/2010 | Aquarius | B65B 35/56 53/443 |
| 2010/0199612 A1* | 8/2010 | Gustafsson | B65B 43/123 53/473 |
| 2014/0158766 A1 | 6/2014 | Paske et al. | |
| 2017/0372106 A1* | 12/2017 | Wilkinson | G05B 19/12 |

OTHER PUBLICATIONS

International Search Report for PCT Application No. PCT/EP2017/080844, dated Mar. 1, 2018 in 6 pages.
Cho, Jung-Hyun et al., "An NFC transceiver with RF-Powered RFID transponder mode", Nov. 12, 2007, IEEE Asian Solid-State Circuits Conference, IEEE, pp. 172-175, XP007905495.
Written Opinion for PCT Application No. PCT/EP2017/080844 in 9 pages.

* cited by examiner

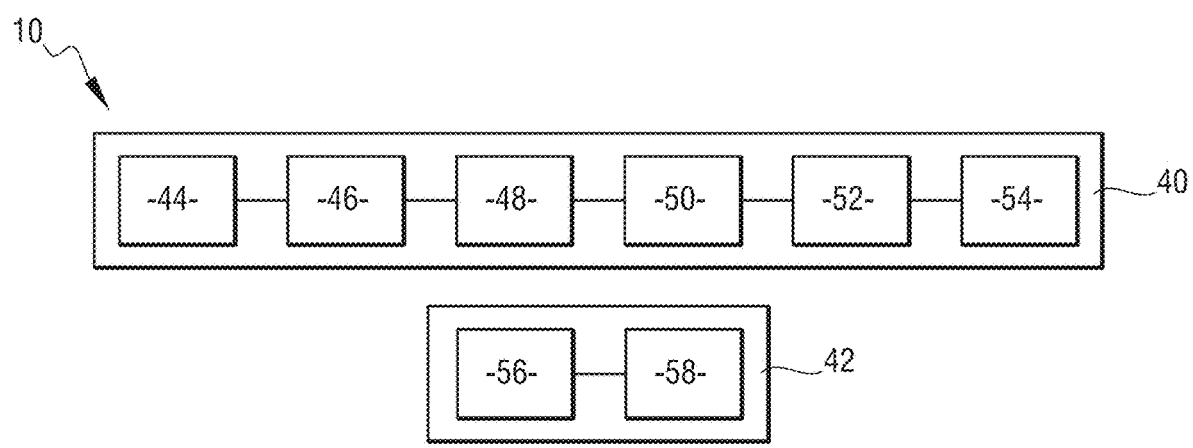
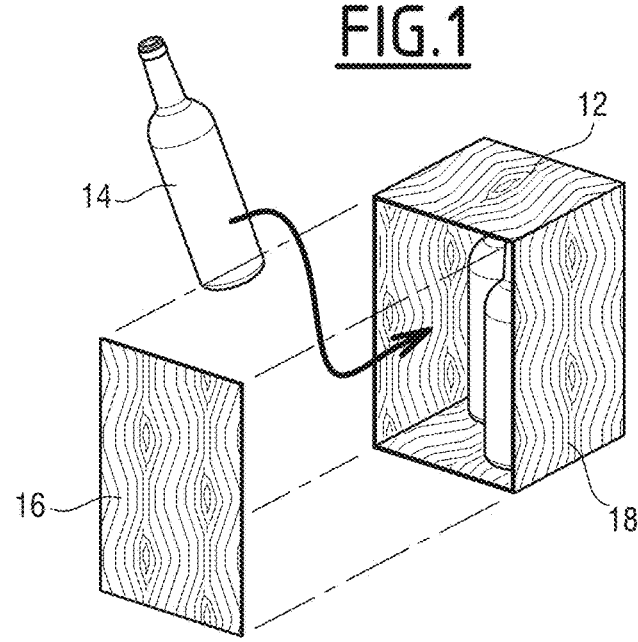
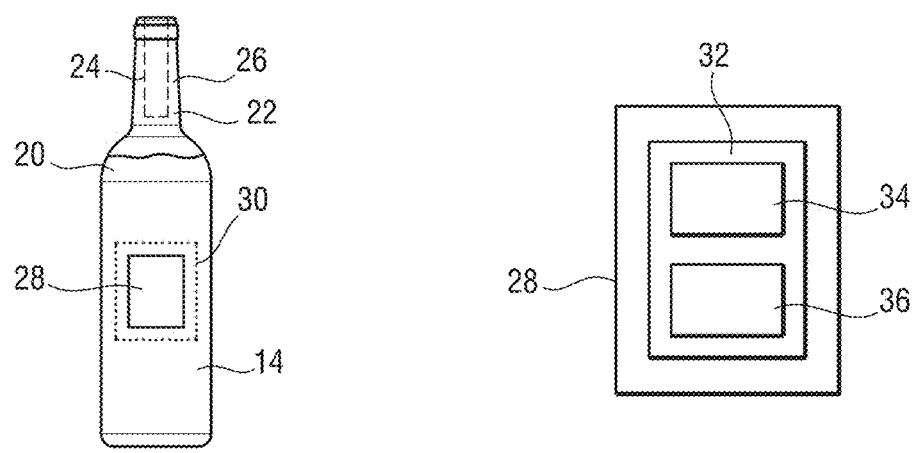
FIG.1
FIG.2
FIG.3
FIG.4

MANAGEMENT SYSTEM, INSTALLATION AND ASSOCIATED ASSEMBLY METHOD

CROSS-REFERENCE TO RELATED APPLICATIONS

This application is the U.S. National Phase under 35. U.S.C. § 371 of International Application PCT/EP2017/080844, filed Nov. 29, 2017, which claims priority to French Patent Application No. 16 61654, filed Nov. 29, 2016. The disclosures of the above-described applications are hereby incorporated by reference in their entirety.

FIELD OF THE INVENTION

The present invention relates to a management system. The invention also relates to an installation comprising such a management system and to a method of assembling the management system.

BACKGROUND OF THE INVENTION

In a general and simplified way, wine making takes place in seven main steps.

In a first step, the harvesting of grapes is performed. It is advisable to harvest the grapes at the right moment, the determination of this moment demanding considerable know-how. Depending on the case, the harvest is performed by hand or with harvesters. During the harvesting, the bunches of grapes are sorted, in particular to eliminate unsuitable fruits.

In a second step, grinding and pressing takes place. The grinding and pressing step is usually carried out automatically to obtain a juice.

The third step is the fermentation usually carried out in a fermentation chamber. The juice undergoes a chemical transformation, i.e. the alcoholic fermentation, during which the glucose becomes ethanol.

The next step is clarification to eliminate all waste and wine residues. The clarification is implemented by a filter or by bonding.

The next step is to carry out aging in stainless steel or ceramic tanks, or in wooden casks. All five previous steps form a phase called then aging phase.

The sixth step is to bottle the wine. The wine is bottled after the aging phase. During this bottling step, the bottles are sterilized. A rinser is then used to wash the empty bottles, then a dispenser to fill the bottles with wine and finally a corker to put a cork in the neck of the bottles. The bottling step also comprises overcapping and labeling.

In some variants, aging is also carried out in a bottle.

The seventh step is the casing of the wine.

It is desirable for the rate of wine production to be accelerated in view of the growing demand for this product, but without suffering any reduction in quality.

As has been described, all the steps are perfectly mastered and are generally automated so that the increase in the rate of production is achieved by effective optimization of each step.

There is therefore a need for a system for increasing the rate of producing wine while maintaining the same quality for the wine so produced.

SUMMARY OF THE INVENTION

For this, the present description relates, in particular, to a bottle case management system, wherein each bottle is provided with an electronic chip, and wherein the management system comprises a first framework having a first frame, a second framework having a second frame, wherein the second frame is complementary to the first frame, while the assembly of the two frames forms a framework delimiting an internal opening intended for the insertion of a conveyor on which cases are able to move in a running direction, wherein the opening has an internal dimension in a direction orthogonal to the running direction between 300 mm and 1000 mm, and wherein at least one chip reader is comprised in the framework.

According to particular embodiments, the management system comprises one or more of the following characteristics, taken in isolation or in any technically feasible combination:

- the at least one chip reader is inserted in the framework.
- the first frame has a C shape with a middle part and two straight parts, while the second frame has an I shape, wherein the first frame is arranged so that the two straight parts are parallel to a direction transverse to the running direction.
- the framework has four panels, wherein a chip reader is present in each panel.
- the at least one chip reader is an antenna forming a loop surrounding the internal opening.
- the framework has an upper panel, a first side panel, a bottom panel and a second side panel, wherein at least one of the following properties is checked:
    - the upper and lower panels have external faces with a length between 500 mm and 1200 mm,
    - the upper and lower panels have external faces with a length of between 700 mm and 1000 mm,
    - the upper and lower panels have external faces with a height of between 500 mm and 1200 mm,
    - the upper and lower panels have external faces with a height of between 800 mm and 1000 mm,
    - the internal opening has a height of between 300 millimeters and 1000 millimeters, and
    - the internal opening has a length of between 300 mm and 1000 mm.
- the framework is provided with four rails, wherein the four rails are for housing elements.
- the management system comprises a power cabinet, wherein the power cabinet is secured to the second frame.
- the first frame has a C shape and the second frame has an I shape.
- the second frame is removable.
- the management system comprises a support for the framework and a mechanism for adjusting the height of the support between two positions, wherein the difference in height between the two positions is between 20 cm and 70 cm.
- the support is provided with wheels.
- the management system comprises a fixing interface between the two frames.
- the management system comprises a detector to detect the presence of a case in the internal opening, and a user terminal.
- the bottles contain an alcoholic beverage and the microchip contains information relating to the contents of the alcoholic beverage.
- the electronic chip is able to operate according to two distinct communication protocols, wherein at least one chip reader comprised in the framework is designed to operate according to the first communication protocol, while the management system comprises a reader designed to operate according to the second communication protocol.

This description also describes a bottle case preparation installation comprising the management system as described above.

According to one embodiment, the present description also describes an installation, comprising a bottling part and a casing part, wherein the casing part comprises a first conveyor on which bottles travel to fill a case, and a second conveyor that is designed to transport the cases from a first location to a second location, while the second conveyor is inserted into the internal opening of the management system.

The present description also describes a method of assembling a management system for bottles cases moving on a conveyor, wherein each bottle is provided with an electronic chip, and wherein the management system comprises a first framework comprising a first frame, a second framework comprising a second frame, and wherein the second frame is complementary to the first frame, while the assembly of the two frames forming a framework delimit an internal opening designed for the insertion of a conveyor on which the cases to be managed travel in a running direction, wherein the internal opening has a dimension in a direction orthogonal to the running direction between 300 mm and 1000 mm, wherein at least one chip reader is inserted into the framework. The method comprises a step of installing the first frame in position so that the first frame surrounds the second conveyor, and a step of assembling the second frame to the first frame.

According to particular embodiments, the assembly method comprises one or more of the following characteristics, taken in isolation or in any technically feasible combination:

BRIEF DESCRIPTION OF THE DRAWINGS

FIG. 1 shows a schematic view of a wine bottle case preparation installation comprising a conveyor, FIG. 2 shows a schematic view of a case, FIG. 3 shows a schematic view of a bottle provided with a label, FIG. 4 shows a schematic view of the label of the bottle of FIG. 3.

DETAILED DESCRIPTION OF THE PREFERRED EMBODIMENTS

Figure 5:
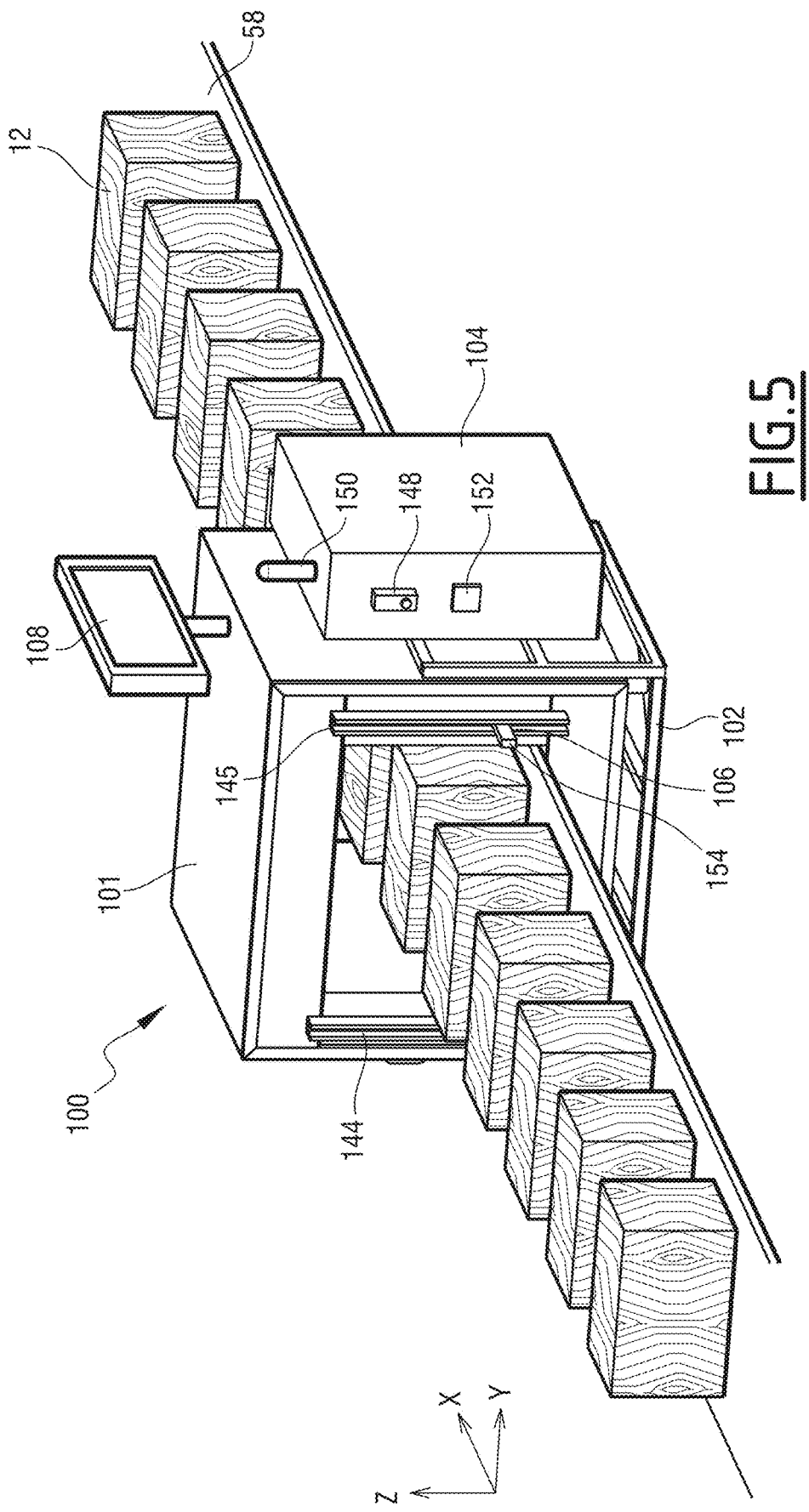
FIG. 5 shows a perspective view of a conveyor provided with an example of a management system.

An apparatus 10 is shown in FIG. 1 for preparing a case of wine bottles.

The cases 12 are intended to store bottles 14.

In the example shown, the cases 12 are each designed to accommodate six bottles 14.

Alternatively, the cases 12 may each be designed to accommodate a different number of bottles 14. For example, the number may be three.

The cases 12 have two parts visible in FIG. 2, namely a lid 16 and a case 18.

The bottles 14 are put in the case 18 as indicated by the arrow in FIG. 2 and then the lid 16 is put on the case 18.

For example, the lid 16 may be fixed to the case 18 with screws.

The cases 12 are made of wood.

In the example shown, the case 12 is of parallelepipedal shape.

A bottle 14 is shown in FIG. 3.

Each bottle 14 contains a liquid substance 20.

According to the proposed example, the liquid substance 20 is wine.

Alternatively, the liquid substance 20 may be alcohol.

According to another variant, the liquid substance 20 may be spirits.

In all three cases, the bottle 14 is a bottle of alcohol.

According to another embodiment, the bottle 14 may be a bottle of perfume.

The bottle 14 has a barrel, a bottom, a shoulder and a neck.

The barrel is the main and widest part of the bottle 14. The barrel is sometimes named "body".

The bottom closes the barrel so that the bottle 14 may be placed easily on a flat surface. Depending on the case, the bottom may be flat, convex or semi-convex.

The shoulder is the flared part that connects the neck to the barrel.

The collar corresponds to the tapered portion at the top. The collar defines a space usually called the neck 22.

The neck 22 generally comprises a flange protruding with respect to the outer surface of the neck 22 and offset with respect to the upper end of the neck 22.

A cork 24 is inserted into the neck 22.

An overcap 26 covers the cork 24.

The overcap 26 is generally metallic (tin or aluminum) and comprises a skirt which extends from the upper end of the neck 22 over a certain height, of the order of 5 cm to 6 cm. Thus, the lower edge of the overcap 26 is shifted downwards with respect to the collar by a distance of the order of 3 to 4 cm.

Upon opening the bottle 14, the overcap 26 is cut with a cutting tool along a cutting line positioned just above the collar. After cutting, the upper part of the overcap 26 may be removed to allow the cork 24 to be removed. The lower part of the overcap 26 in the form of a sleeve is retained on the bottle 14.

A label 28 and a back label 30 are affixed to the barrel.

The label 28 is sometimes referred to as the "main label".

The label 28 has a visible face and a non-visible face

In fact, the legal information and the identity of the bottle 14 (as a brand) appear on the visible face of the label 28.

Additional information is provided on the back label 30.

Each bottle 14 is provided with an electronic chip 32.

According to the example of FIG. 4, the electronic chip 32 is present on the non-visible face of the label 28.

The electronic chip 32 is glued by an adhesive on the non-visible face of the label 28.

The application of the electronic chip 32 on the bottle 14 may be performed during the bottling using a machine for depositing labels.

Nevertheless, other locations for the electronic chip 32 are also possible, such as in the overcap 26.

The electronic chip 32 comprises a microprocessor 34 associated with an antenna 36 for the exchange of signals. The microprocessor 34 also comprises a memory capable of storing information.

The electronic chip 32 is thus associated with information that the memory of the microprocessor 34 memorizes.

For example, the electronic chip 32 may store information relating to the contents of the bottle 14, i.e. the amount of wine that the bottle 14 contains.

In another example, the electronic chip 32 may store information relating to the container from which the wine contained in the bottle 14 originates.

In another example, the electronic chip 32 may store information relating to the production site, an identifier of the bottle, the identifier of the producer of the bottle, the name of the bottle profile, the date and time data of the bottling, the date and time of leaving production.

The electronic chip 32 is a first wireless telecommunication means.

According to the example described, the electronic chip 32 is an RFID chip (Radio Frequency Identification).

According to international standards, each RFID chip has a unique identifier. Thus, two RFID chips can not have the same identifier.

To give an order of magnitude, the RFID chip is a rectangle 35 mm long by 20 mm wide. Nevertheless, the RFID chip is not limited to this geometry and may have variable dimensions and shapes (square, rectangular, round, . . . ).

The installation 10 has a bottling portion 40 and a casing portion 42.

The bottling portion 40 comprises a sterilizer 44, a rinser 46, a printer 48, a capper 50, a wrapper 52 and a labeler 54.

The casing portion 42 comprises a plurality of conveyors 56 and 58: a first conveyor 56 on which the bottles 14 travel to fill a case 12, and a second conveyor 58 intended to transport the cases 12 from a first location E1 to a second location E2.

The second conveyor 58 on which the cases 12 and a management system 100 are traveling are shown in FIG. 5.

The second conveyor 58 is a straight line.

This thus defines a running direction corresponding to the running direction of the cases 12. The running direction is symbolized by an X axis in FIG. 1. In the following description, the running direction is denoted running direction X.

A vertical direction is also defined, wherein the vertical direction is perpendicular to the running direction X and corresponds to the vertical of the site (the normal direction to the ground). The vertical direction is symbolized by an axis Z visible in FIG. 1. In the remainder of the description, the vertical direction is denoted vertical direction Z.

A transverse direction is also defined, wherein the transverse direction is perpendicular to the running direction X and the vertical direction Z. In FIG. 1, the transverse direction is symbolized by a Y axis. In the following description, the transverse direction is denoted transverse direction Y.

Furthermore, in the following description, a dimension of an element in the running direction X is called the depth of the element, while a dimension of an element in the vertical direction Z is called the height of the element. The element and a dimension of an element along the transverse direction Y is called the length of the element.

The second conveyor 58 is designed to move cases 12 to be managed in a running direction X.

According to the example presented, the second conveyor 58 is a conveyor belt.

The management system 100 is a case supervision system 12.

"Management" is understood to mean both an inventory problem (number of bottles 14), and an identification problem, i.e. association of a case 12 with specific information, in particular relating to the contents of each bottle 14.

The management system 100 comprises a framework 101, a support 102, a power cabinet 104, a presence detector 106, and a user terminal 108.

Figure 6:
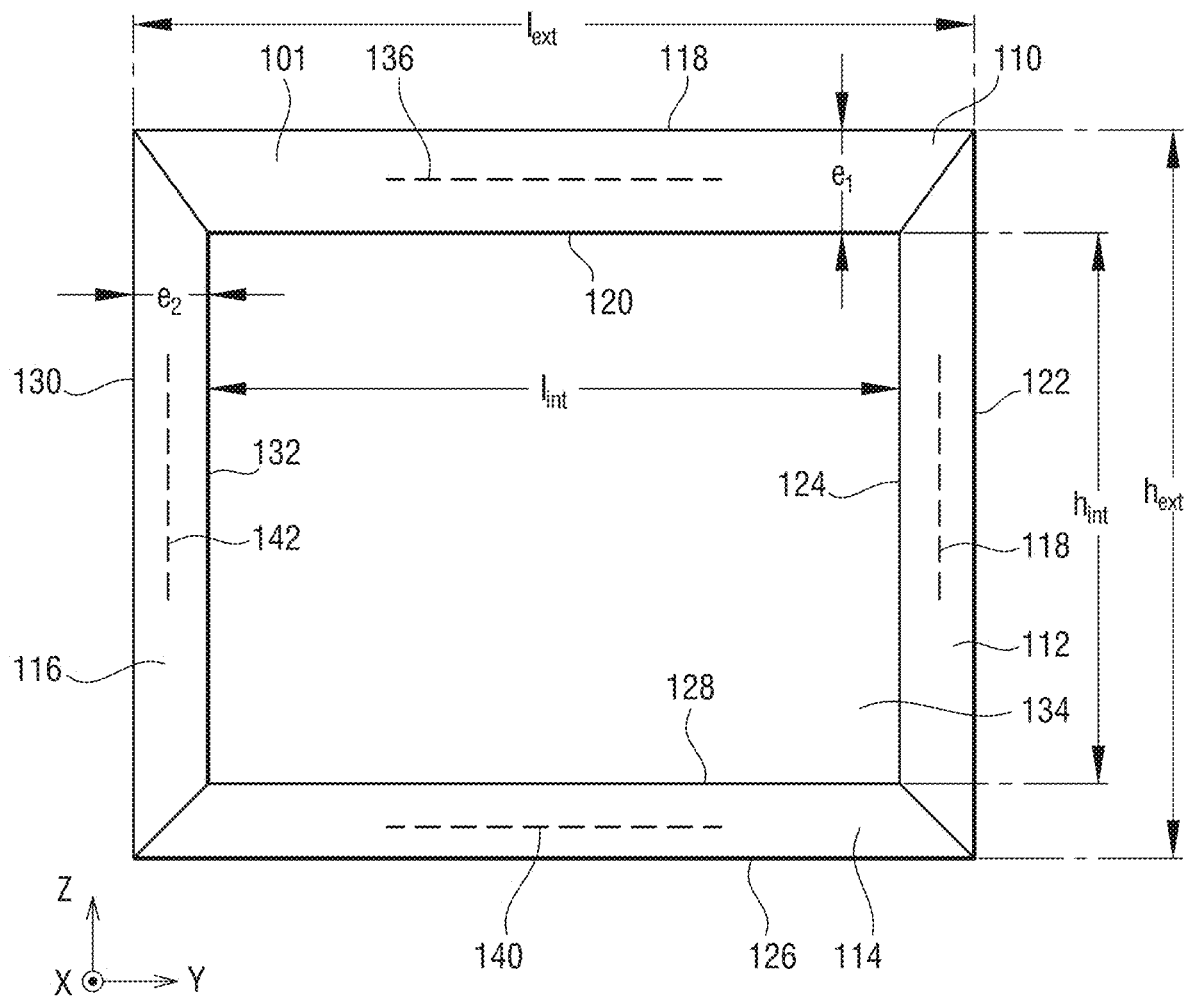
FIG. 6 shows a schematic view of part of the management system.

The framework 101 is more specifically shown in FIG. 6, wherein FIG. 6 corresponds to a sectional view in a plane perpendicular to the running direction X.

The framework 101 is a rectangular framework.

The framework 101 has four panels: an upper panel 110, a first side panel 112, a bottom panel 114, and a second side panel 116.

In the example shown, each panel 110, 112, 114 and 116 has the same shape, which facilitates the production of the framework 101.

An outer face and an inner face are defined for each panel 110, 112, 114 and 116 more specifically, the upper panel 110 has an outer face 118 and an inner face 120; the first side panel 112 has an outer face 122 and an inner face 124; the lower panel 114 has an outer face 126 and an inner face 128, and the second side panel 116 has an outer face 130 and an inner face 132.

The assembly of each outer face 118, 122, 126 and 130 forms an outer wall while the assembly of each inner face 120, 124, 128 and 132 forms an inner wall. The outer and inner walls are connected by a side wall.

The outer faces 118 and 126 of the upper panel 110 and lower panel 114 have a length called external length $l_{ext}$.

The external length $l_{ext}$ is between 500 mm and 1200 mm.

The expression "is between" is to be understood in a broad sense. Thus, a quantity A is between a first value A1 and a second value A2 when, on the one hand, the quantity A is greater than or equal to the first value A1 and, on the other hand, the quantity A is less than or equal to the second value A2.

According to the embodiment described, the external length $l_{ext}$ is between 700 mm and 1000 mm.

More precisely, according to the example described, the external length $l_{ext}$ is equal to 900 mm.

The outer faces 122 and 130 of the side panels 112 and 116 have a height called external height $h_{ext}$.

The external height $h_{ext}$ is between 500 mm and 1200 mm.

According to the embodiment described, the external height $h_{ext}$ is between 800 mm and 1000 mm.

More precisely, according to the example described, the external height $l_{ext}$ is equal to 900 mm.

A first thickness e1 is also defined corresponding to the distance between the inner face 120 and outer face 118 of the upper panel 110.

In the example described, the distance between the inner face 128 and outer face 126 of the lower panel 114 is equal to the first thickness e1.

A second thickness e2 is also defined corresponding to the distance between the inner face 130 and the outer face 132 of the second side panel 116.

In the example described, the distance between the inner face 124 and the outer face 122 of the first side panel 112 is equal to the second thickness e2.

The inner wall, and thus the framework 101, delimits an internal opening 134.

In other words, the internal opening 134 is delimited by the inner face 120, 124, 128 and 132 of each panel 110, 112, 114 and 116.

The internal opening 134 is designed for the passage of a conveyor and a case.

The internal opening 134 has a dimension along a direction orthogonal to the running direction X of between 300 mm and 1000 mm (first relationship).

According to the embodiment described, the dimension along a direction orthogonal to the running direction X is between 500 mm and 1000 mm (second relationship).

More precisely, the dimension along a direction orthogonal to the running direction X is between 600 mm and 800 mm (third relationship).

More precisely, according to the example described, the internal opening 134 has a dimension along a direction chosen from the vertical direction Z and the transverse direction Y satisfying the previous relationships.

This means, for the first relationship, that the internal height $h_{int}$ of the internal opening 134 is between 300 mm and 1000 mm or that the internal length $l_{int}$ of the internal opening 134 is between 300 mm and 1000 mm.

More precisely, according to the example described, the internal length $l_{int}$ of the internal opening 134 is equal to 700 mm.

In addition, depending on the specific case, the internal height $h_{int}$ of the internal opening 134 is equal to 700 mm.

According to the example shown, the framework 101 is made of stainless steel, which means that each panel 110, 112, 114 and 116 is made of stainless steel.

The framework 101 is provided with a double plate fixing to eliminate the shoulder.

At least one chip reader is present in the thickness of one of the panels 110, 112, 114 and 116.

Alternatively, the framework 101 may comprise each chip read. For example, the chip reader may be placed on one of the panels 110, 112, 114 and 116.

In this context, each reader is in the form of an antenna.

It should be noted that each reader is then a second means of wireless communication capable of interacting with at least one first wireless communication means.

According to the example of FIG. 6, a chip reader is present in each panel 110, 112, 114 and 116.

More specifically, a first chip reader 136 is present in the upper panel 110; a second chip reader 138 is present in the first side panel 112; a third chip reader 140 is present in the bottom panel 114, and a fourth chip reader 142 is present in the second side panel 116.

The four chip readers 136, 138, 140 and 142 thus make it possible to detect a bottle 12 by sending waves from four distinct locations in space, which makes it possible to guarantee good probability of detection.

The framework 101 is also provided with four rails. Two rails 144, 145 are visible in FIG. 5.

The other rails 146, 147 are located on the other side of the visible portion of the management system 100 in FIG. 5 and are similar to the two rails 144, 145. The other rails 146 and 147 are visible in FIG. 7.

The rails 144 and 145 extend mainly in the vertical direction Z.

The rails 144 and 145 have a U-shaped cross-section. Such rails 144 and 146 are sometimes referred to as "U-shaped" sections.

The rails 144 and 145 are made of aluminum.

The rails 144 and 145 are placed on either side of the second conveyor 58.

The rails 144 and 145 make it easy to house elements offering additional functionalities to the management system 100.

In the example described, the elements are part of the presence detector 106.

The support 102 is able to support the framework 101.

The support 102 is adjustable along the vertical direction Z.

For this, the support 102 comprises a mechanism for adjusting the height of the support 102.

The adjustment mechanism is, for example, a set of four threaded rods adjustable in height.

The support 102 is thus able to adjust the position of the framework 101 between two positions.

The difference in height between the two positions is between 300 mm and 700 mm.

According to the example described, the difference in height between the two positions is equal to 500 mm.

According to one embodiment, the support 102 may comprise wheels facilitating the transport of the support 102.

The power cabinet 104 comprises all the power supplies for supplying electrical power to the four chip readers 136, 138, 140 and 142.

For example, the cabinet 104 comprises power supplies capable of producing 220 V while being powered from the mains.

The cabinet 104 is provided with an interface 148 ensuring telecommunications between the user terminal 108 and a global network, such as the Internet.

Alternatively, the cabinet 104 may be provided with an interface 148 for telecommunications between the user terminal 108 and a local area network. For example, in such an embodiment, the interface 148 is an Ethernet switch.

The cabinet 104 also comprises a luminous column 150.

In the example shown, the luminous column 150 has a first color when a case 12 is in the internal opening 134 and a second color when no case 12 is present in the internal opening 134.

The cabinet 104 also comprises a safety device 152 that is manually operable by an operator.

The actuation of the safety device 152 allows safe shutdown of the management system 100.

Alternatively, the cabinet 104 may also comprise one or more chip readers.

Each chip reader is designed to interact with at least one microchip 32.

The operating protocol of the chip reader(s) is advantageously distinct from the operating protocol of the four chip readers 136, 138, 140 and 142 inserted in the framework 101.

The presence detector 106 is able to detect the presence of a case 12 in the internal opening 134.

For example, as seen partially in FIG. 5, the presence detector comprises a light source (for example a laser) and a photodiode 154 cooperating to detect any object crossing a predefined line.

The light source and the photodiode 154 are inserted on feet having a complementary shape with the rails 144 and 145.

According to the proposed example, the presence detector 106 is also able to detect when the case 12 leaves the internal opening 134.

For this, another light source and another photodiode are installed on the other rails 147 and 148.

The presence detector 106 cooperates with the luminous column 150 so that the color of the luminous column 150 changes according to the presence of a case 12 in the internal opening 134.

Other types of presence detector 106 are possible, such as a cell associated with a reflector.

The user terminal 108 may be, for example, a digital personal assistant more generally designated by the acronym PDA.

The user terminal 108 is comparable to a processing module.

The user terminal 108 comprises processing software stored in a memory, a processor on which the processing software may be executed, and a man/machine interface comprising, as the case may be, a screen.

In a variant, the man/machine interface may comprise a screen and a keyboard.

The user terminal 108 is connected to the four chip readers 136, 138, 140 and 142.

According to the proposed case, a controller located in the cabinet 104 provides the link between the user terminal 108 and the four chip readers 136, 138, 140 and 142.

The user terminal 108 makes it possible to perform several operations that are the identification, the creation, the association of information, and the deletion of information.

In what follows, only the identification part is more specifically described.

The operation of the installation 10, and, in particular, the operation of the management system 100, is now described.

The operation of the installation 10 is in accordance with the operation of an installation 10 according to the prior art except at the level of the second conveyor 58 using the management system 100. Also, in the following, only the operations at the level of the second conveyor 58 are described.

A case 12 whose content is to be checked is input into the management system 100.

The presence detector 106 detects the arrival of the case 12 and changes the color of the luminous column 150.

For example, the color changes from green to red.

The user terminal 108 is then used to request that the four chip readers 136, 138, 140 and 142 interact with the electronic chips 32 present on the bottles.

The interaction enables the user terminal 108 to retrieve information present on the electronic chips 32.

The user terminal 108 then verifies this information with regard to a database storing similar information for the case 12 to be checked.

The case 12 then leaves the internal opening 134 causing the change of the luminous column 150 from the color red to green.

Assuming that the database information and the information detected by the four chip readers 136, 138, 140 and 142 coincide, the case 12 is considered valid and sent for delivery to a reseller or consumer.

In the opposite case, the case 12 is eliminated from the second conveyor 58.

The management system 100 makes it possible to quickly check the contents of a case 12 without having to open the case 12.

In addition, the verification may be as precise as desired since the number of items of information may be as high as desired.

In particular, the management system 100 is compatible with cases 12 called "variegated" containing bottles 14 with different wines.

At the production site or at the packaging service providers, the identification and control of all the cases 12 are thus optimized, in particular to anticipate the preparation of orders.

It should be noted that the spraying of the bottles 14 contained in the cases 12 does not prevent the use of the management system 100.

Figure 7:
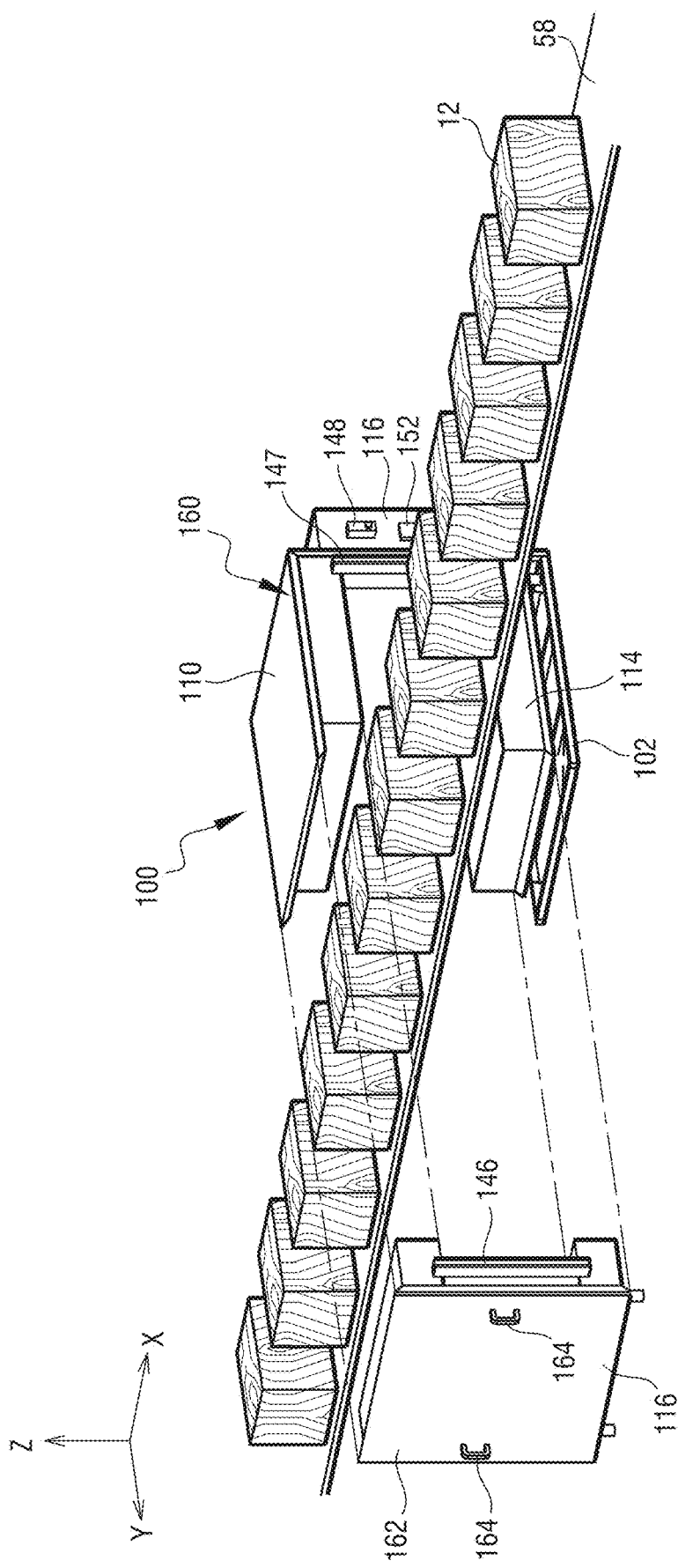
FIG. 7 shows a view of the assembly of the management system on a conveyor.

In addition, the management system 100 is easy to assemble as shown with reference to FIG. 7 which describes the assembling of the management system 100 on the second conveyor 58.

In fact, it appears that the framework 101 has two frames: a first frame 160 and a second frame 162.

The first frame 160 has a first form.

The first frame has the form of the section of the first frame 160 according to the running direction X.

According to the example described, the second frame is C-shaped.

The C has a middle part and two straight parts. The middle part is parallel to the vertical direction Z while the two straight parts are parallel to the transverse direction Y.

Alternatively, the first frame 160 may be retractable.

The second frame 162 has a second shape.

According to the proposed example, the second frame 162 and the cabinet 104 are integral.

The second frame is a sectional frame according to the running direction X.

The second frame is complementary to the first frame.

The term "complementary" in this context, is understood to mean that the assembly of the two frames 160 and 162 form the framework 101.

According to the example described, the first frame is I-shaped.

The "I" extends mainly in the vertical direction Z.

The second frame 162 is removable.

The two frames 160 and 162 are assembled by an attachment interface.

In the example proposed, the attachment interface is a screw designed to cooperate with a corresponding hole.

In addition, to facilitate gripping, the first frame 160 is provided with two handles 164.

This allows easy assembly of the management system 100.

The assembly method comprises a step of assembling the first frame 160 in position, so that the first frame 162 surrounds the second conveyor 58.

For this, the support 102 is advantageously used to adjust the position of the first frame 160 along the vertical direction Z.

The mounting method comprises a step of assembling the second frame 162 to the first frame 160.

In the assembly step, the handles 164 and the attachment interface are used.

On the one hand, the assembly is easy and, on the other hand, effective independently of the conveyor.

As a result, the management system 100 is compatible with any type of conveyor, making it a management system 100 that may be described as "universal".

Other embodiments are also conceivable for the management system 100.

In particular, the electronic chips 32 may be of different types.

Thus, the electronic chips correspond to all the electronic devices (integrated circuits) making it possible to store at least one item of information and to communicate with another device according to a contactless communication protocol.

Thus, according to a particular embodiment, the electronic chip 32 is an NFC chip (Near Field Communication), allowing near-field reading (with a maximum distance of about 4 cm between the electronic chip 32 of the bottle 14 and the chip reader).

The communication protocol is then a near field communication protocol of the NFC type defined according to the standards recognized by the NFC Forum, including ISO/IEC 14443-1 to ISO/IEC 14443-4.

It should be noted that the NFC standard is a wireless communication standard (called near-field communication or NFC communication) for communicating electronic chips with a very large number of devices, including wireless mobile phones. This makes it possible to trace the bottle 14 before and after it has been placed in the case 12.

According to one particular case, the electronic chip 32 is able to operate according to two distinct frequency ranges. In this sense, the electronic chip 32 may be described as a two-frequency chip.

On the one hand, the electronic chip 32 is able to communicate according to a first communication protocol called UHF mode (Ultra High Frequency).

In such a communication protocol, the electronic chip 32 is capable of transmitting or receiving a signal having a frequency of between 300 MHz and 3000 MHz.

On the other hand, the electronic chip 32 is able to communicate according to a second communication protocol called HF mode (High Frequency).

In such a protocol, the electronic chip 32 is capable of transmitting or receiving a signal having a frequency of between 3 MHz and 30 MHz.

The management system 100 comprises at least one reader designed to operate according to the first communication protocol and one reader designed to operate according to the second communication protocol.

In a specific embodiment, each panel 110, 112, 114 and 116 comprises two chip readers: a reader designed to operate according to the first communication protocol (UHF mode) and a reader designed to operate according to the second communication protocol (HF mode).

The first protocol may be, for example, in accordance with ISO14443 (NFC protocol) or ISO15693 (RFID protocol) standards. The communication range according to the first protocol is preferably less than 20 cm.

The second protocol is, for example, in accordance with ISO18000-6C also known as EPC1Gen2. Such a second protocol corresponds to a range of between 15 cm and 10 m, more particularly between 5 m and 10 m.

According to another variant, the two communication protocols are respectively an NFC protocol and an RFID protocol.

Such a chip has the advantage that the technology is inert, that pulling it is destructive, that the chip is able to withstand temperatures between −40° C. and 85° C., that its life is greater than 50 years, and that its thickness is less than 0.2 mm.

The electronic chip 32 may also be made differently.

Thus, in general, the electronic chip 32 comprises an electronic device with at least one integrated circuit, more particularly a microprocessor, and at least one antenna.

According to the embodiments, the electronic device may be passive or semi-passive and may integrate a sensor such as a temperature sensor, for example.

According to another embodiment, the chip reader may be an antenna forming a loop surrounding the internal opening 134. The loop is inserted into the framework 101 in the thickness of each of the panels 110, 112, 114 and 116. This kind of loop improves the performance of the chip reader.

For example, a loop part is inserted into the first frame 160 and another portion of the loop is inserted into the second frame 162. When assembling the management system 100, the two parts of the loop are connected together to form the loop.

The invention corresponds to any technically feasible combinations of the embodiments described above.

What is claimed is:

1. A management system for cases of bottles, wherein each bottle is provided with an electronic chip, the management system comprising:
    a first frame having a first shape,
    a second frame having a second shape,
    the second shape being complementary to the first shape, the assembly of the two frames forming a framework delimiting an internal opening intended for the insertion of a conveyor on which cases will run in a running direction, the internal opening having a dimension along a direction orthogonal to the running direction of between 300 millimeters and 1000 millimeters, at least one chip reader being included in the framework;
    wherein the management system comprises a support for the framework and a mechanism for adjusting the height of the support between two positions, the difference in height between the two positions being between 20 centimeters and 70 centimeters.

2. The management system according to claim 1, wherein the at least one chip reader is inserted into the framework.

3. The management system according to claim 1, wherein the first frame is C-shaped having a middle portion and two straight portions and the second frame is I-shaped, the first frame being arranged so that the two straight portions are parallel to a direction transverse to the running direction.

4. The management system according to claim 1, wherein the framework comprises four panels, with a chip reader being present in each panel.

5. The management system of claim 1, wherein the at least one chip reader is a loop antenna surrounding the internal opening.

6. The management system according to claim 1, wherein the framework has an upper panel, a first side panel, a bottom panel and a second side panel, at least one of the following properties being verified:
    the upper panel and lower panel having outer faces having a length of between 500 millimeters and 1200 millimeters the upper panel and lower panel have outer faces having a length of between 700 millimeters and 1000 millimeters,
    the upper panel and lower panel have outer faces having a height of between 500 millimeters and 1200 millimeters,
    the upper panel and lower panel have outer faces having a height of between 800 millimeters and 1000 millimeters,
    the internal opening has a height of between 300 millimeters and 1000 millimeters, and
    the internal opening has a length of between 300 millimeters and 1000 millimeters.

7. The management system according to claim 1, wherein the framework is provided with four rails, the four rails for housing elements.

8. The management system according to claim 1, wherein the management system comprises a power cabinet, the power cabinet being secured to the second frame.

9. The management system according to claim 1, wherein the management system comprises a presence detector of a case in the internal opening and a user terminal.

10. The management system according to claim 1, wherein the bottles contain an alcoholic beverage and the electronic chip comprises information relating to the contents of the alcoholic beverage.

11. The management system according to claim 1, wherein the electronic chip is designed to operate according to two distinct communication protocols, the at least one chip reader comprised in the framework being designed to operate according to the first communication protocol, and the management system comprising a reader designed to operate according to the second communication protocol.

12. A bottle case preparation installation comprising the management system according to claim 1.

13. The bottle case preparation installation according to claim 12, comprising a bottling portion and a casing portion, the casing portion comprising a first conveyor on which bottles run to fill a case and a second conveyor designed to transport the cases from a first location to a second location, the second conveyor being inserted into the internal opening of the management system.

14. A method for assembling a management system of cases of bottles running on a conveyor, each bottle being provided with an electronic chip, the management system comprising:

a first frame having a first shape,
a second frame having a second shape, the second shape being complementary to the first shape,
the assembly of the two frames forming a framework delimiting an internal opening intended for the insertion of a conveyor on which cases run in a running direction, the internal opening having a dimension along a direction orthogonal to the running direction of between 300 mm and 1000 mm, at least one chip reader is inserted in the framework, wherein the management system comprises a support for the framework and a mechanism for adjusting the height of the support between two positions, the difference in height between the two positions being between 20 centimeters and 70 centimeters, the method comprising a step of:
installing the first frame in position so that the first frame surrounds the conveyor, and
assembling the second frame to the first frame.

* * * * *